No. 671,640. Patented Apr. 9, 1901.
G. H. SMITH.
CREAM SEPARATOR.
(Application filed Jan. 24, 1900.)
(No Model.)
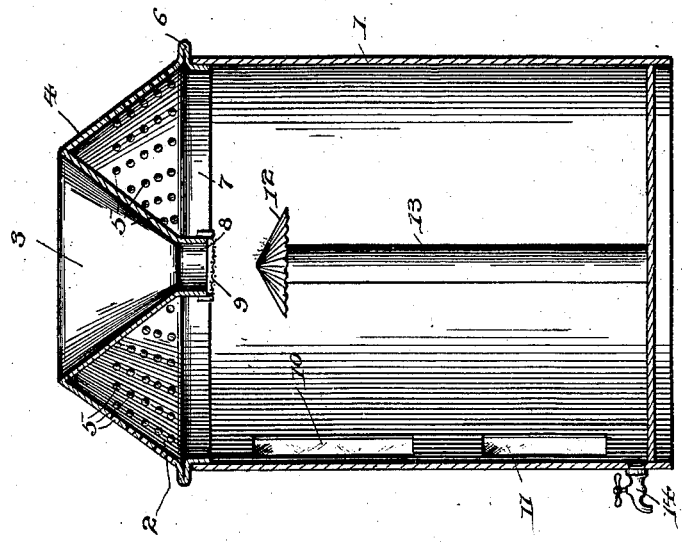
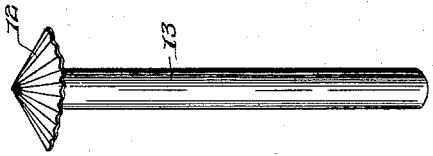
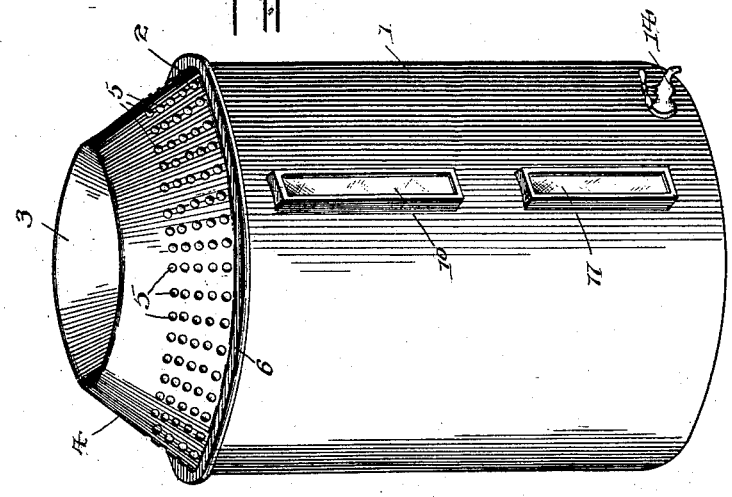
Witnesses
F. E. Alden.
H. F. Riley.
George H. Smith, Inventor.
By his Attorneys
C. A. Snow & Co.

UNITED STATES PATENT OFFICE.

GEORGE H. SMITH, OF URBANA, OHIO.

CREAM-SEPARATOR.

SPECIFICATION forming part of Letters Patent No. 671,640, dated April 9, 1901.

Application filed January 24, 1900. Serial No. 2,686. (No model.)

*To all whom it may concern:*

Be it known that I, GEORGE H. SMITH, a citizen of the United States, residing at Urbana, in the county of Champaign and State of Ohio, have invented a new and useful Cream-Separator, of which the following is a specification.

The invention relates to improvements in cream-separators.

The object of the present invention is to improve the construction of cream-separators and to provide a simple, inexpensive, and efficient device designed to receive milk as soon as it comes from the cow and capable of aerating and purifying the same and of separating the cream from the milk.

The invention consists in the construction and novel combination and arrangement of parts hereinafter fully described, illustrated in the accompanying drawings, and pointed out in the claim hereto appended.

In the drawings, Figure 1 is a perspective view of a cream-separator. Fig. 2 is a vertical sectional view of the same. Fig. 3 is a detail perspective view of the spreader.

Like numerals of reference indicate corresponding parts in all the figures of the drawings.

1 designates a cylindrical receptacle designed to receive a supply of cold water for lowering its temperature to chill the milk as it is delivered into the device and remove the impurities of the same and separate the cream from the milk. The receptacle is provided with a cap or cover 2, composed of inner and outer inclined walls 3 and 4, united at the top of the cap or cover, as clearly illustrated in Fig. 2 of the accompanying drawings. The outer wall 4, which inclines upward and inward to form a tapering trunco-conical track, is provided with perforations 5 and has a horizontal supporting-flange 6 and a depending flange 7, which extends into the receptacle, whereby the cap or cover is securely held thereon. The inner and outer oppositely-inclined walls 3 and 4 are disposed in substantially the same horizontal plane, and their upper and lower edges are arranged in substantially the same planes. The inner wall 3, which is imperforate, inclines downward and inward and forms a funnel and is provided with a depending cylindrical portion or flange 8, located at its lower edge and having a strainer 9 detachably secured to it, whereby the milk is strained as it is poured into the device, as hereinafter explained. The inner imperforate wall, which forms a funnel, extends downward to a point below the imperforate portion of the outer wall of the cap or cover, and it forms a deflector and is adapted to throw gases and impurities outward toward the perforations should such gases impinge against it in their ascent to the top of the device. The strainer may be mounted on the depending flange or portion 8 by any suitable means, and it is preferably readily removable in order that it may be cleaned after use.

The receptacle is provided with upper and lower transparent panels 10 and 11, forming gages and adapted to enable the operator to inspect readily the contents of the device.

The receptacle is supplied with a sufficient quantity of cold water before the milk is poured into it, the cold water being preferably equal in bulk to the milk to be separated. The milk is poured into the cap or cover, which forms a funnel to direct the same to the center of the receptacle, and the milk entering the receptacle contacts with a conical corrugated separator 12, adapted to divide the milk into fine spray or sheets, whereby the warm milk will be thoroughly subjected to the cold air and will be aerated and purified, the gases passing upward and outward through the perforations 5. The perforations 5 are formed in the lower portion of the outer wall of the cap or cover, the upper portion of the outer wall being imperforate to form a shield. This will prevent the gases and impurities passing outward through the perforations from coming in contact with the milk as it is poured into the device. If the perforations were extended to the extreme upper edge of the outer wall, the gases issuing at the top of the device around the central funnel portion might affect the milk as it is poured into the separator.

The conical corrugated spreader 12 is mounted on a stem or support 13 and is located centrally of the cap a short distance below the strainer 9, so that the milk will be thrown outward in all directions. The stem or support 13 preferably consists of a tube or rod, suitably secured to the bottom of the receptacle. After the milk is poured into the device it is permitted to remain therein from sixty to ninety minutes, which time is amply sufficient to cause the cream to rise to the surface of the liquid. The diluted sweet milk, which has been separated from the cream, is drawn off at the bottom of the receptacle through a spigot 14 or other suitable means, and by watching the cream-line through the transparent portions of the receptacle the operator may readily ascertain when the diluted milk has been drawn off. The cream is then removed and the operation is completed.

It will be seen that the cream-separator is exceedingly simple and inexpensive in construction, that it is easily operated, and that the milk as it is poured into the separator breaks and spreads in fine sheets to contact with the conical corrugated spreader and is thereby thoroughly aerated and purified by coming in contact while warm with the cold air of the receptacle. It will also be apparent that the cap or cover forms an imperforate inner funnel and is provided with a perforated outer wall to permit the gases and odors to escape from the milk and that the imperforate inner wall forms a deflector and is adapted to throw the gases which impinge against it outward toward the perforations. The imperforate inner wall extends below the perforated portion of the outer wall, and the perforations terminate short of the top of the outer wall to provide an imperforate upper portion, so that the gases and odors given off by the milk will not escape directly at the point where the milk is poured into the separator.

What is claimed is—

A cream-separator comprising a cylindrical receptacle, the cap 2 composed of the oppositely-inclined inner and outer walls, the inner wall being imperforate and united to the outer wall at the top of the cap and provided with a contracted lower end, and the outer wall being provided at the upper edges of the receptacle with a perforated lower portion for the escape of gases and having the solid imperforate upper portion located between the perforated portion and the top of the cap, the lower edges of the outer wall being arranged in the same horizontal plane as the lower contracted end of the inner wall and being bent to provide horizontal and vertical flanges to fit the top of the receptacle, said cap serving as a cover for the receptacle and forming a funnel and also providing a shield to prevent the escape of gases at the point where the milk is introduced into the separator, and a conical spreader supported directly beneath the contracted lower end of the inner wall, substantially as and for the purpose described.

In testimony that I claim the foregoing as my own I have hereto affixed my signature in the presence of two witnesses.

GEORGE H. SMITH.

Witnesses:
JOSEPH W. FLAUGHER,
ISAAC N. NEESE.